United States Patent
Cosaro et al.

(10) Patent No.: US 6,790,312 B2
(45) Date of Patent: Sep. 14, 2004

(54) TUBE-FORMING UNIT FOR A FORM-FILL-SEAL MACHINE

(75) Inventors: Lino Cosaro, Milan (IT); Stefano Capitani, Como (IT)

(73) Assignee: Cryovac, Inc., Duncan, SC (US)

(*) Notice: Subject to any disclaimer, the term of this patent is extended or adjusted under 35 U.S.C. 154(b) by 0 days.

(21) Appl. No.: 10/370,989

(22) Filed: Feb. 20, 2003

(65) Prior Publication Data

US 2003/0221790 A1 Dec. 4, 2003

(30) Foreign Application Priority Data

Feb. 26, 2002 (GB) .............................................. 0204515

(51) Int. Cl.[7] .............................................. B29C 65/08
(52) U.S. Cl. .............................. 156/580.1; 156/580.2; 53/451; 53/479; 53/551
(58) Field of Search ............................... 156/73.1, 203, 156/544, 580.1, 580.2; 53/451, 479, 551, 375.9, DIG. 2; 493/189, 193, 288

(56) References Cited

U.S. PATENT DOCUMENTS

| | | | | |
|---|---|---|---|---|
| 4,517,790 A | * | 5/1985 | Kreager ....................... 53/552 |
| 4,630,429 A | * | 12/1986 | Christine ...................... 53/479 |
| 4,726,171 A | * | 2/1988 | Kreager et al. ................ 53/410 |
| 5,242,529 A | | 9/1993 | Riedel |
| 5,244,532 A | * | 9/1993 | Wadium et al. ........... 156/580.1 |
| 5,775,055 A | * | 7/1998 | Giacomelli et al. ......... 53/371.2 |
| 6,379,483 B1 | * | 4/2002 | Eriksson .................... 156/73.1 |

FOREIGN PATENT DOCUMENTS

WO    WO 98/36896    8/1998

* cited by examiner

Primary Examiner—James Sells
(74) Attorney, Agent, or Firm—Mark B. Quatt

(57) ABSTRACT

A form-fill-seal machine has an ultrasonic vibration emitter head 11 positioned outside the tube being formed by the overlapping of the margins 3 and 5 of a film web, and an anvil 13 positioned inside the tube defined by those margins, the anvil being mounted on an anvil carrier 25 which is supported by a frame element entirely independent of the forming box 1 used to fold the film, so as to isolate the anvil from vibrations sustained from the forming box. The anvil carrier can be mounted directly to a carrier body for the ultrasonic vibration emitter, and preferably has the shape of an inverted letter J where the anvil is positioned near the toe 25a of the J, the mounting to the sealing machine frame is at the top of the stem 25c of the J, with a slot 25b between the toe 25a and the stem 25c.

11 Claims, 6 Drawing Sheets

TUBE-FORMING UNIT FOR A FORM-FILL-SEAL MACHINE

This application claims priority under 35 USC §119 to, and the benefit of, UK Patent Application No. 0204515.1 filed Feb. 26, 2002.

FIELD OF THE INVENTION

The present invention relates to form-fill-seal machines, which traditionally come as either horizontal form-fill-seal machines (HFFS) or vertical form-fill-seal (VFFS) machines. Although the present invention is exemplified in terms of a tube-forming unit for a horizontal form-fill-seal machine, the invention may equally be applied to a vertical form-fill-seal machine using ultrasonic sealing of the overlapping margins of the film along a longitudinal line to define the tube into which the product articles are to be inserted.

BACKGROUND OF THE INVENTION

Traditionally, the longitudinal seal in an HFFS machine has been achieved using a heat seal apparatus which contacts the outer surface of the superposed film margins to define a lap seal to finish a tube which can then be sealed transversely to separate one pack from the next, there being a product placed inside the tube between successive transverse seals as the first such seal is formed but before the second such seal is formed, and so on through the packaging process.

The longitudinal lap seal can be achieved using an ultrasonic sealing unit which traditionally involves an emitter of ultrasonic vibrations (sonotrode or hammer) and an anvil such that the films to be sealed are compressed between the hammer and the anvil and become sealed as a result of the transmission of energy thereto resulting from the ultrasonic vibrations of the hammer.

In the case of an HFFS machine, one side of the lap seal can be inside the tube and the other side can be outside the tube. An anvil can be mounted on the film forming box so as to be positioned inside the film tube while the sonotrode or hammer is mounted on the outside of the tube.

In the present invention, the anvil can be mount entirely independently of the forming box, but preferably integral with the mount for the sonotrode or hammer, such that the gap between the sonotrode and the anvil is not going to vary with any machine vibrations arising in use of the HFFS machine.

SUMMARY OF THE INVENTION

In one aspect of the invention, a tube-forming unit for a form-fill-seal machine comprises a form-fill-seal forming box, an ultrasonic vibration emitter, and an anvil able to be positioned such that film portions to be longitudinally lap sealed can pass between the anvil and the ultrasonic vibration emitter; characterised in that the anvil is mounted on an anvil carrier independent of the form-fill-seal forming box, to isolate the anvil from any vibrations sustained by the forming box.

In a second aspect of the invention, an ultrasonic sealing unit for the longitudinal lap sealing of a film conformed into a tubular form comprises an anvil secured, through an anvil carrier, to the underside of a carrier body which also supports a sonotrode vertically positioned over and in register with the anvil, wherein the anvil carrier comprises a first anvil support portion arranged to extend transversely across the machine direction, and a second anvil support portion, integral with the first anvil support portion, but defining therewith a gap through which a lower longitudinal edge of the film can pass over said second anvil support portion, thus becoming available for lap sealing to an upper longitudinal edge of the film.

BRIEF DESCRIPTION OF THE DRAWINGS

A detailed description of preferred embodiments of the invention follows, with reference to the attached drawings, wherein.

DETAILED DESCRIPTION OF THE INVENTION

Figure 1:
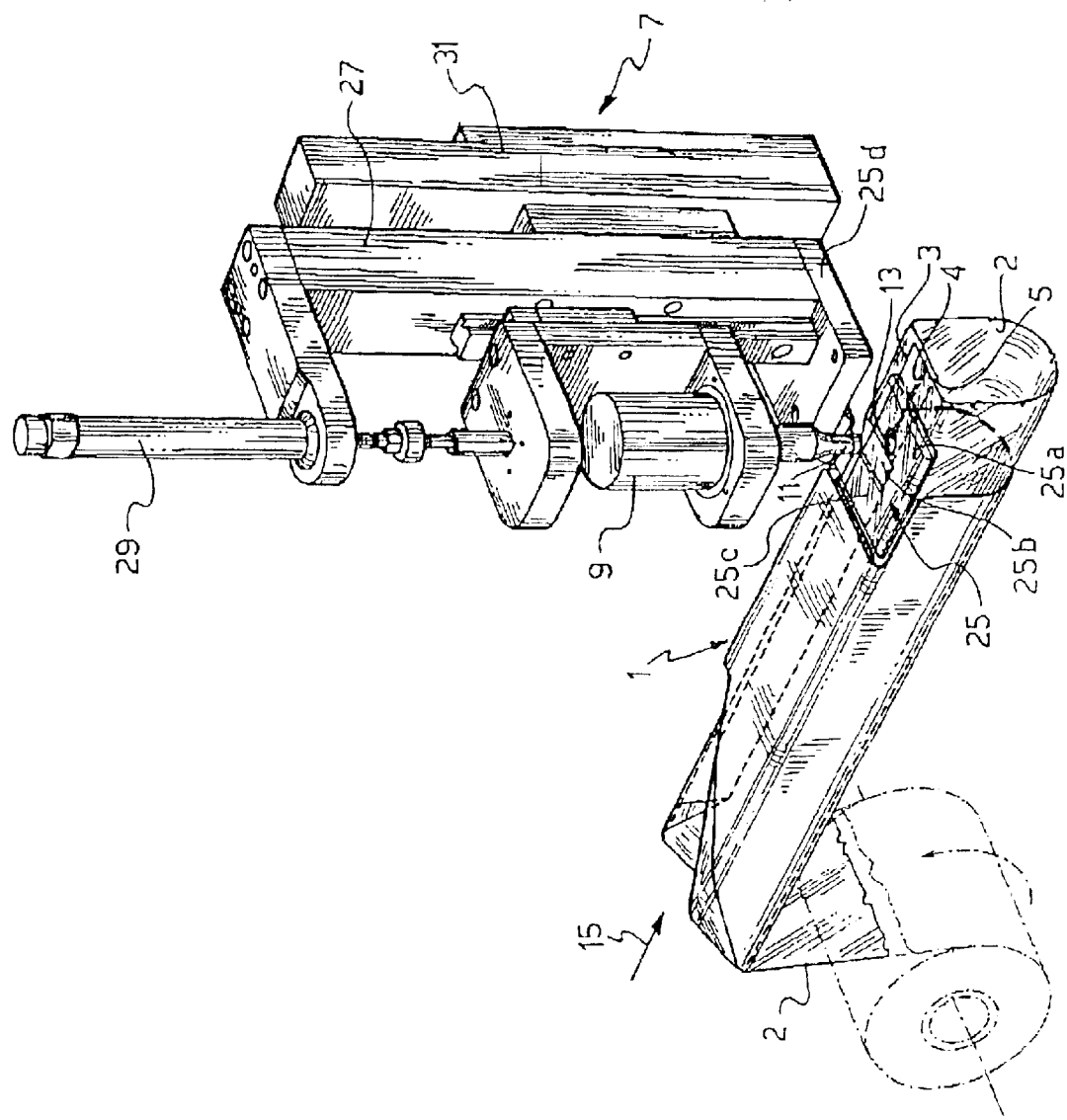
FIG. 1 is a perspective view of a tube-forming unit for an HFFS machine using ultrasonic lap sealing according to the present invention.

FIG. 1 shows a tube forming unit for a HFFS machine including a forming box 1, inside which a flat film 2 is folded into a tube with a first longitudinal margin 3 superposed over a second longitudinal margin 5, and a separate sonotrode/anvil sealing unit 7, whose design allows the direct overlap of said margins in the area between the sonotrode and the anvil and therefore the formation of the desired longitudinal lap seal in the film tubing. The sealing unit 7 has a sonotrode driver 9 which stimulates ultra-sonic vibrations in a sonotrode head (horn) 11 relative to a fixed anvil 13 which is carried inside the tubular array of the film exiting the forming box 1 by the special design of the anvil carrier 25.

Figure 2:
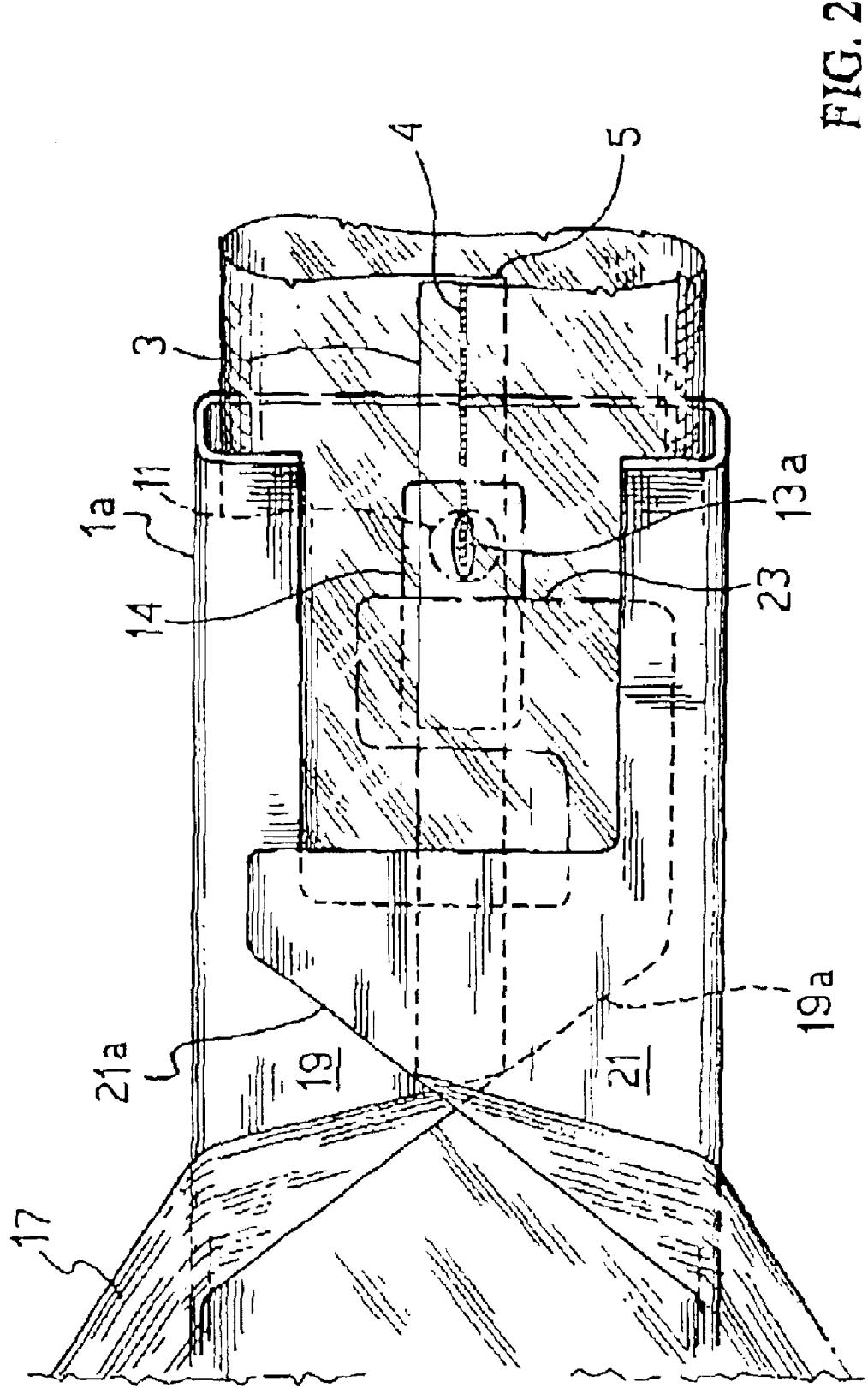
FIG. 2 is a drawing showing the forming box of a prior art proposal for an HFFS machine using ultrasonic lap sealing, omitting the sonotrode or hammer.

FIG. 2 shows a plan view of a prior art tube forming unit for a HFFS machine comprising a forming box 1a having a film sheet 17 being folded and formed into a tube by bringing a first longitudinal margin 3 of the film in superposed position with respect to a second longitudinal margin 5, by means of folding blades 19 and 21 (19a and 21a being the edges of blades 19 and 21 respectively). In said prior art tube forming unit, the anvil 13a of the ultrasonic sealing unit is mounted on a carrier 14 secured to the downstream end 23 of the top of the forming box 1a. In practice, the anvil 13a has the shape of a lozenge and is cantilevered from the downstream end of the forming box by virtue of the elongate carrier 14. It will be understood that the overlapped margins 3 and 5 within the forming box 1a emerge from under the blade 21, as they move towards the anvil 13a, to ensure that the carrier 14 and the anvil 13a thereon are underneath the overlapped margins 3 and 5 to position the anvil 13a directly below the intended line of the longitudinal lap seal 4. Suitable positioning of a ultrasonic hammer or sonotrode (not shown) outside the tube and directly in register with the lozenge-shaped anvil 13a will then allow the overlapped film margins 3 and 5 to be sealed along the line 4 during use of the apparatus as the tube is moved rightwardly while being formed to have the section of the forming box shown in FIG. 2. This system has the big disadvantage that any machine vibrations which are either generated at the forming box or transmitted to the forming box will be transmitted to the anvil 13a and this will impair the reliability of the ultrasonic seal as the distance between the anvil and the hammer will no longer be consistent and thus also the energy transmitted and the strength of the seal thus obtained.

Figure 3A:
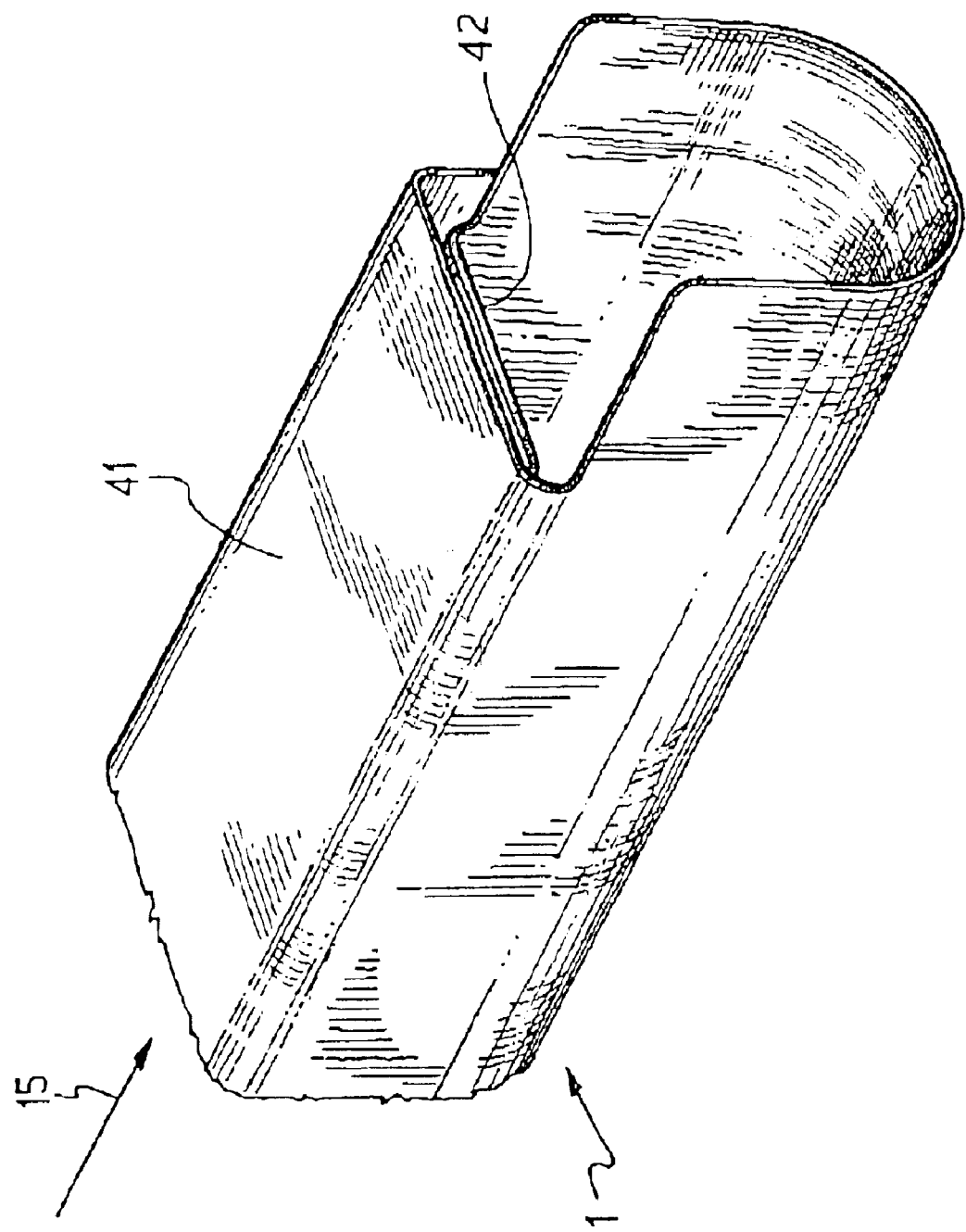
FIG. 3a is a drawing showing a forming box 1 that can suitably be employed in the tube forming unit of the invention.
Figure 3B:
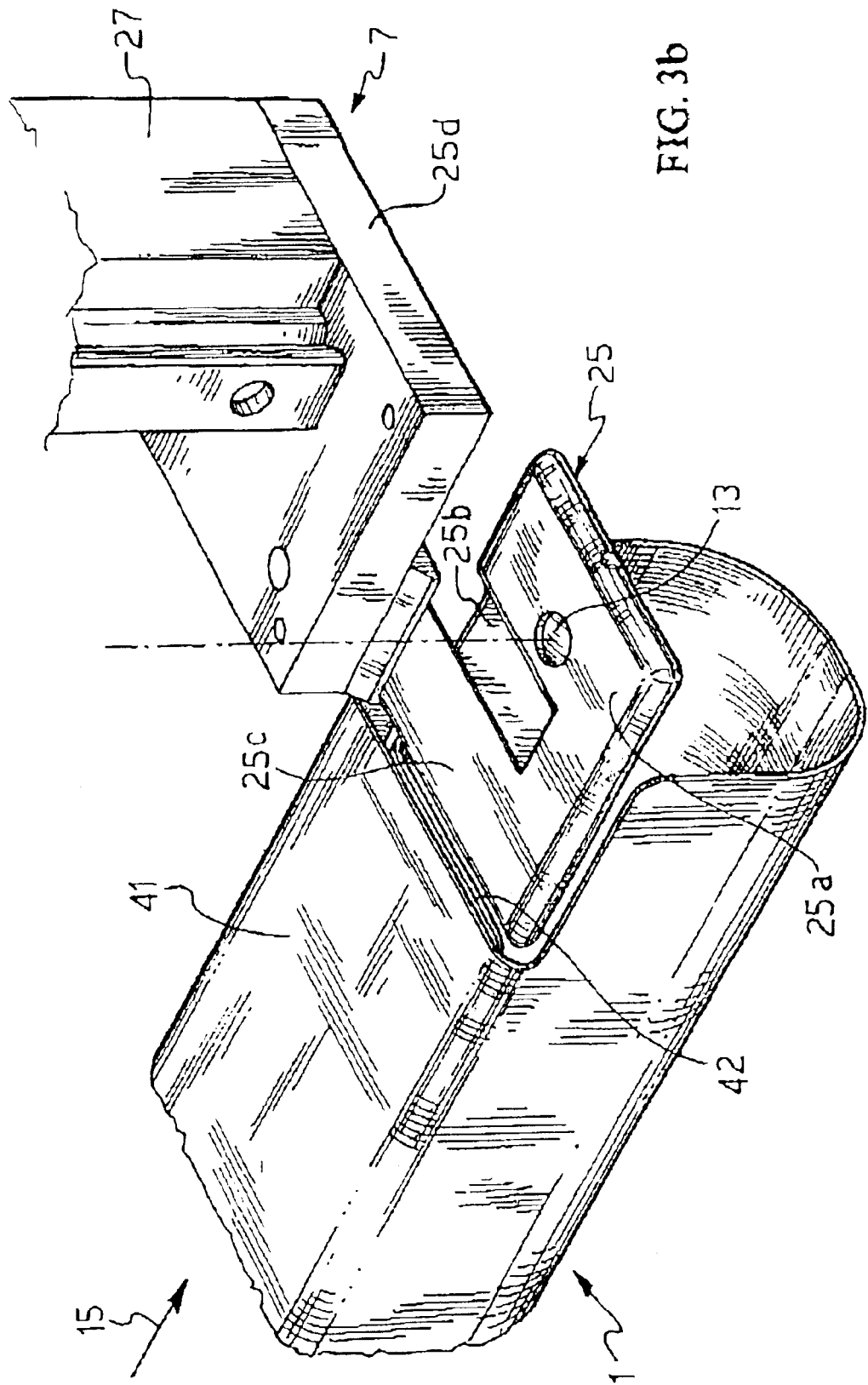
FIG. 3b shows the combination of said forming box 1 with the ultrasonic sealing unit, limited in said Figure to the anvil and the anvil carrier.
Figure 4:
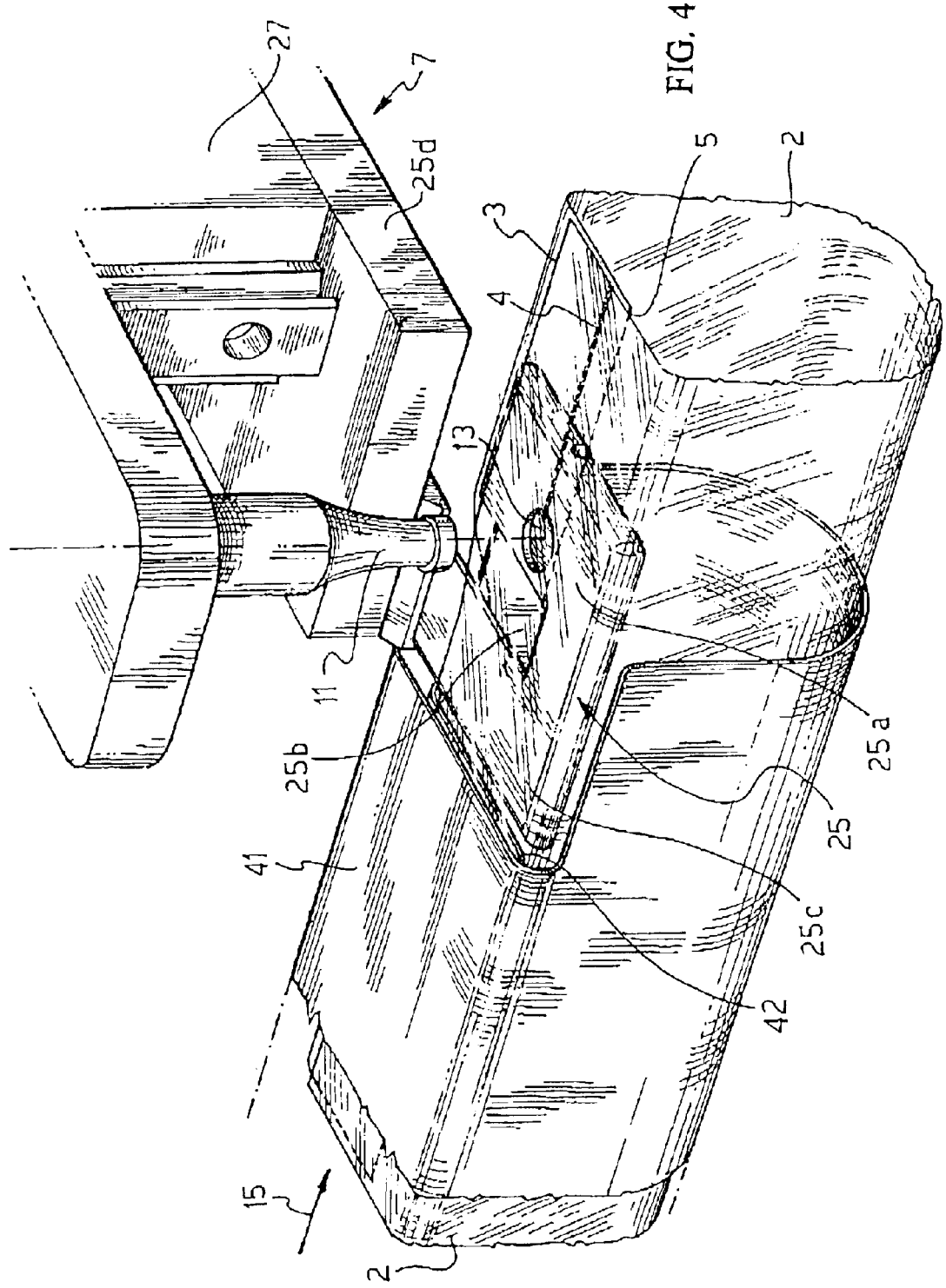
FIG. 4 is a detailed perspective view of the tube forming unit of FIG. 1 according to the present invention, centered to the area where the lap seal is formed.
Figure 5:
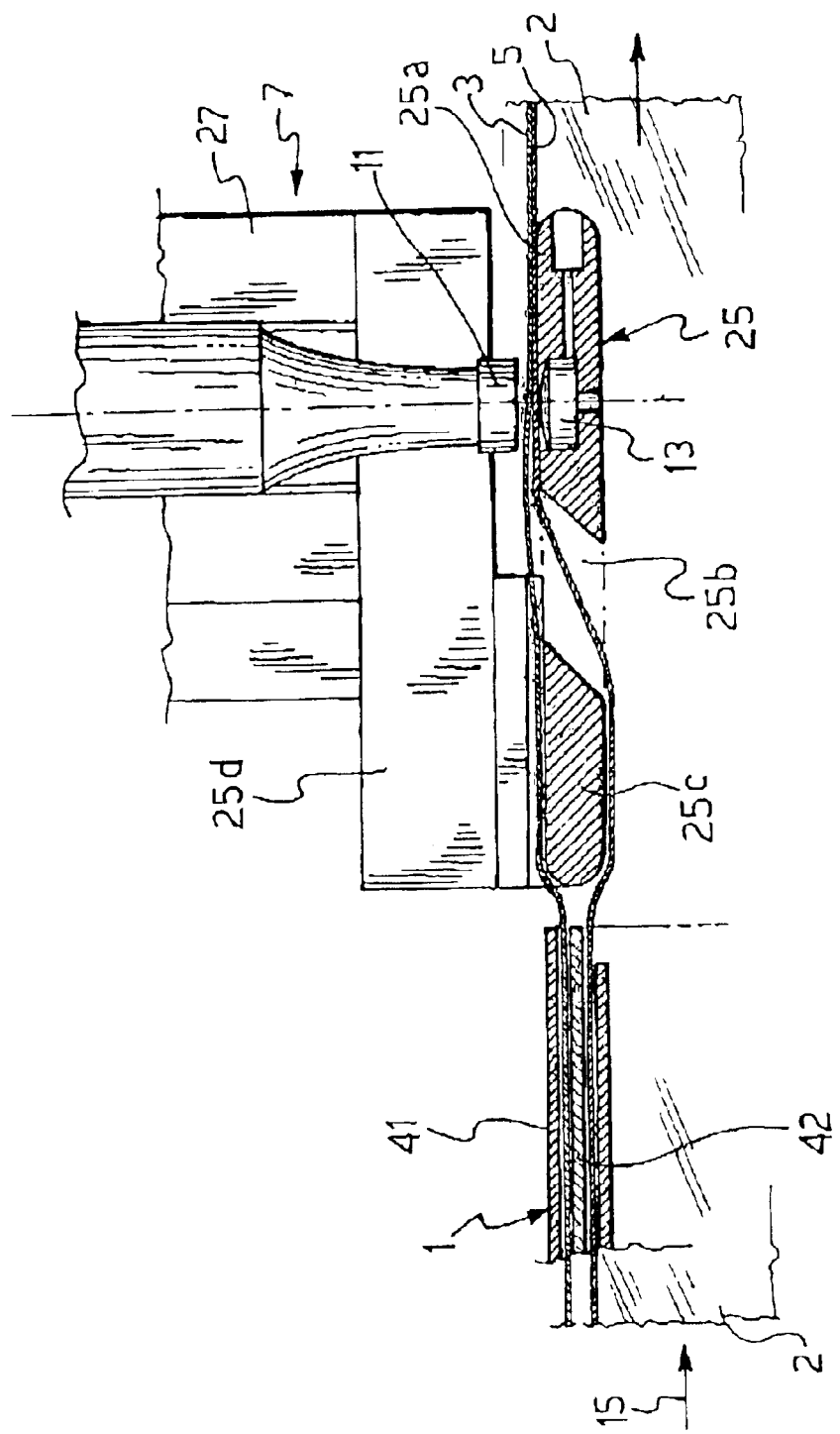
FIG. 5 is a cross-section through the anvil carrier of the ultrasonic sealing unit of FIG. 1 in accordance with the present invention.

On the contrary, in accordance with the present invention, and as shown in FIGS. 1, 4, 5, and in more detail in FIG. 3b, the anvil carrier 25 for the anvil of the ultrasonic sealing system is separate from the forming box 1 and preferably also from any frame element to which the forming box is secured, so that any machine vibrations which are either generated at the forming box or transmitted to the forming box will be isolated from the anvil carried by the anvil carrier 25.

Furthermore, being isolated from the forming box, the material used for the manufacture of the anvil carrier can be much more substantial than the relatively thin metal sheet, which must by necessity be used to manufacture the forming box in view of the need to be able to bend the sheet to precisely rectangular form as shown in FIG. 1, or indeed precisely to any other suitable form which requires flexibility and therefore lack of undue thickness of the sheet defining the forming box. In the case of the anvil carrier 25 of the tube forming unit of the present invention, the material is typically thicker than the mild steel sheet generally used for defining the forming box, and its mounting is more robust than the box sheet so that the anvil is more firmly supported than it would be if mounted on the material of the forming box. In the prior art system shown in FIG. 2, even if the carrier strap 14 were to have been made relatively thick in relation to the material of the forming box, any vibration transmitted to the forming box would of necessity have caused vibration of the anvil 13a despite the robustness of its mounting strap 14 because it will simply transmit to the anvil any vibrations which are sustained by the forming box.

According to a preferred embodiment of the present invention illustrated in FIG. 1, the anvil carrier 25 is secured to the underside of a carrier body 27 which both supports the sonotrode driver 9 carrying the sonotrode or hammer head (or horn) 11 and a resilient urging unit 29 to press the sonotrode downwardly against the superposed film margins at the lap seal, and is also itself slidably mounted in relation to a machine frame element 31 to allow simultaneous upward and downward adjustment movement of the combination of the sonotrode, driver and anvil. This adjustment is necessary when it is desired to adjust the level of the seal when a new mounted forming box is provided to fit products of a different size. In practice, the HFFS machine has the forming box connected to a carrier frame element by its underside so that when the size of the forming box is changed in order to accommodate a shallower or taller product article within the formed tube, the upper level of the forming box is changed and therefore also the level of the anvil 13 has to be changed accordingly in order to permit continuing operation of the ultrasonic sealing unit at the point where the two film margins are overlapped to form the lap seal. The precise means by which the sonotrode carrier body 27 is slidably mounted for vertical adjustment relative to the frame element 31 will be readily apparent to the expert in this art and needs no further description.

As can be seen in FIGS. 1 and 5, and in more detail in FIGS. 3b and 4, the plan view of the anvil carrier 25 resembles the shape of an inverted letter J such that the anvil 13 is near the toe 25a of the J and the mounting to the sealing machine frame is at the top of the stem 25c of the J, wherein the slot defined between the toe 25a and the stem 25c of the anvil carrier is indicated in said Figures as 25b.

In use, the wrapping material employed to form the tube is pulled off a reel in a horizontal plane and is driven along the direction indicated by arrow 15 into the forming box 1 where the material is guided in such a way to fold it in the form of a tube. Generally the system is also equipped with a continuously moving conveyor pushing the products to be packaged into the tube as it forms, i.e. at the entrance of the forming box, and before it reaches the lap sealing station.

With reference to FIGS. 3a, 3b and 4, the forming box, is designed in such a way that the upper longitudinal edge 3 of the film is positioned between the outer blade 41 and the inner folded blade 42. The film then follows the inner surface of the forming box and ends with the other longitudinal edge 5 under the folded blade 42, the two edges, 3 and 5, being one (3) superposed to the other (5). The transverse edge of the outer blade 41 (substantially corresponding to what was shown as 21 in the prior art embodiment of FIG. 2) is roughly on the same level of the anvil carrier 25, but preferably it is slightly below the level of the anvil carrier 25, because this will facilitate the suitable tensioning of the film. It is however also possible to keep it slightly above the level of the mount. Edge 3 of the film will exit the forming box 1 and ride directly over the stem 25c of the inverted J-shaped anvil carrier. The margin 5 of the film, that in the forming box is below the folded blade 42 will exit the forming box beneath the stem 25c of the inverted J-shaped anvil carrier and it will emerge through the slot 25b between the toe 25a and the stem 25c to ride over the upper surface of the toe 25a, with margin 3 superposed thereto. The two superposed margins, will then become compressed between the anvil 13 and the cooperating face of the sonotrode head (horn) 11 and the longitudinal lap seal 4 will thus be formed.

As shown in FIG. 5 the anvil 13 is preferably in the form of a shallow cylinder or disk having a convex spherical upper surface, the summit of it being aligned with the upper surface of the toe 25a of the inverted J-shaped anvil carrier. This spherical surface of the anvil is particularly advantageous in that it will automatically compensate for any misalignment between the normal to the substantially flat underside of the sonotrode head 11 and the axis of symmetry of the cylindrical body of the anvil 13. Thus if any misalignment of the normal to the sonotrode surface and the axis of the cylinder has occurred in the assembling of the sealing unit or if any such misalignment occurs in the unlikely event of there being any vibrations felt at the anvil 13, the fact that there is a spherical upper surface will render such misalignment totally irrelevant.

FIG. 5 also shows the more substantial mounting bracket 25d which is connected to the upper end of the stem 25c of the anvil carrier and which then is attached to the mounting body 27 of the sonotrode to ensure vibrationless support of the anvil 13 relative to the sonotrode mounting body.

In practice, a grub screw (not shown) can be inserted in the horizontal transverse direction with respect to the product flow such that its tip can impinge on the cylindrical body of the anvil 13 to hold the anvil in place and avoid it being able to vibrate relative to the toe 25a of the anvil carrier.

FIG. 1 shows the situation in which the sonotrode has been lifted relative to the anvil carrier and the anvil 13 so that there is a substantial gap between the sonotrode head 11 and the anvil to facilitate threading up or maintenance of the sealing unit. In practice, once the machine has been threaded up the sonotrode will be driven downwardly by means of the urging means 29 in order to compress the film margins between the substantially flat lower face of the sonotrode head 11 and the spherical upper face of the anvil 13.

Also FIGS. 4 and 5 show the anvil and sonotrode head well apart before such compression occurs.

Conventional anvils for use in ultrasonic sealing units do not adopt the preferred spherical configuration, but may have any other configuration, but such sonotrode designs are considered to be usable with the anvil carrier in the sealing unit of the present invention.

What is claimed is:

1. A tube-forming unit for a form-fill-seal machine, comprising a form-fill-seal forming box, an ultrasonic vibration emitter, and an anvil able to be positioned such that film portions to be longitudinally lap sealed can pass between the anvil and the ultrasonic vibration emitter; characterised in that the anvil is mounted on an anvil carrier independent of the form-fill-seal folding box, to isolate the anvil from vibrations sustained by the forming box.

2. A tube-forming unit according to claim 1, wherein the anvil carrier is secured to a carrier body for the ultrasonic vibration emitter that allows setting of a constant working gap between the ultrasonic vibration emitter and the anvil.

3. A tube-forming unit according to claim 1, wherein the anvil carrier comprises a first anvil support portion arranged to extend transversely across the machine direction, and a second anvil support portion integral with the first anvil support portion but defining therewith a gap through which a lower longitudinal edge of the film can pass over said second anvil support portion, thus becoming available for lap sealing to an upper longitudinal edge of the film.

4. A tube-forming unit according to claim 3, wherein said anvil carrier is in the form of an inverted J with the anvil carried in the toe of the J, and wherein the stem of the J includes connector means for cooperating with a support to allow the carrier to be supported from a machine frame.

5. A tube-forming unit according to claim 1, wherein the anvil is formed separately from the anvil carrier and is replaceably received thereby.

6. A tube-forming unit according to claim 1, wherein the anvil carrier is adjacent to the downstream end of the forming box, with the anvil facing out from the forming box, and slightly above a folded inner blade of the forming box supporting an upper longitudinal edge of the film.

7. A tube-forming unit according to claim 1, wherein a facing surface of at least one of said ultrasonic vibration emitter and said anvil is spherically convex.

8. A tube-forming unit in accordance with claim 7, wherein a facing surface of at least one of said ultrasonic vibration emitter and said anvil is substantially flat.

9. A tube-forming unit in accordance with claim 7, wherein a facing surface of said anvil is spherically convex.

10. An ultrasonic sealing unit for the longitudinal lap sealing of a film conformed into a tubular form, said sealing unit comprising an anvil secured, through an anvil carrier, to the underside of a carrier body which also supports a sonotrode vertically positioned over and in register with the anvil, wherein the anvil carrier comprises a first anvil support portion arranged to extend transversely across the machine direction, and a second anvil support portion, integral with the first anvil support portion, but defining therewith a gap through which a lower longitudinal edge of the film can pass over said second anvil support portion, thus becoming available for lap sealing to an upper longitudinal edge of the film.

11. The ultrasonic sealing unit of claim 10 wherein the anvil carrier has the shape of an inverted J.

* * * * *